United States Patent
Murray

(10) Patent No.: US 12,195,257 B2
(45) Date of Patent: Jan. 14, 2025

(54) POUCH WITH FRANGIBLE SEAL FORMED BY ULTRASONIC SEALING AND METHODS OF FORMING THEREOF

(71) Applicant: POUCH PAC INNOVATIONS, LLC, Sarasota, FL (US)

(72) Inventor: R. Charles Murray, Sarasota, FL (US)

(73) Assignee: Pouch Pac Innovations, LLC, Sarasota, FL (US)

( * ) Notice: Subject to any disclaimer, the term of this patent is extended or adjusted under 35 U.S.C. 154(b) by 0 days.

(21) Appl. No.: 17/365,711

(22) Filed: Jul. 1, 2021

(65) Prior Publication Data

US 2022/0002058 A1 Jan. 6, 2022

Related U.S. Application Data

(60) Provisional application No. 63/047,032, filed on Jul. 1, 2020.

(51) Int. Cl.
*B65D 75/58* (2006.01)
*B65D 75/00* (2006.01)

(52) U.S. Cl.
CPC ....... *B65D 75/5883* (2013.01); *B65D 75/008* (2013.01)

(58) Field of Classification Search
CPC .......................... B65D 75/5883; B65D 75/008
USPC ....................................................... 383/105
See application file for complete search history.

(56) References Cited

U.S. PATENT DOCUMENTS

| | | | |
|---|---|---|---|
| 2001/0015056 A1* | 8/2001 | Hiramoto | B29C 65/7885 53/507 |
| 2007/0261974 A1* | 11/2007 | Balteau | B29C 66/244 206/219 |
| 2008/0276645 A1* | 11/2008 | Murray | B65B 43/465 62/530 |
| 2011/0303345 A1* | 12/2011 | Grass | B29C 66/83221 156/73.1 |
| 2014/0124532 A1* | 5/2014 | Murray | B65D 51/1688 222/107 |
| 2014/0175126 A1* | 6/2014 | Carlsson | A61M 39/10 222/145.5 |
| 2016/0052705 A1* | 2/2016 | Murray | B65D 81/3266 206/277 |

* cited by examiner

*Primary Examiner* — Jes F Pascua
(74) *Attorney, Agent, or Firm* — Fishman Stewart PLLC

(57) ABSTRACT

Embodiments herein are generally directed to a flexible pouch for holding a liquid. The pouch includes a front portion and a back portion defining a compartment, a fitment and a frangible seal. The fitment has a body with a pair of wings extending outwardly from a center portion. The center portion has a spout. The front portion, the fitment and the back portion are joined together by a top seal. The frangible seal join the front portion and back portion beneath the fitment. The frangible seal has one end positioned in a portion of the top seal under one of the pair of wings and another end positioned in a portion of the top seal under another of the pair of wings to separate the spout from the contents in the compartment.

22 Claims, 6 Drawing Sheets

POUCH WITH FRANGIBLE SEAL FORMED BY ULTRASONIC SEALING AND METHODS OF FORMING THEREOF

CROSS REFERENCE TO RELATED APPLICATIONS

This utility patent application claims priority from U.S. Provisional Patent Application Ser. No. 63/047,032, filed on Jul. 1, 2020, and entitled "Pouch with Frangible Seal Formed by Ultrasonic Sealing", the entire contents of which is incorporated herein in its entirety.

TECHNICAL FIELD

The present specification generally relates to pouches and, more specifically, to a flexible pouch having a frangible seal for storing and transporting hydrogenated water.

BACKGROUND

Using flexible pouches to hold liquids and gasses is known. Further, it is known to use frangible seals as a temporary barrier to separate the liquids and/or gasses within the pouch from other liquids and gasses within the pouch and/or from outside influences. It is also known to infuse water with hydrogen. However, if the infused hydrogen comes into contact with oxygen, the hydrogen combines with the oxygen to create water. This is undesirable as this combination eliminates the benefits of hydrogen-infused water. Therefore, a flexible pouch for reducing the amount of oxygen that may mix with hydrogen-infused water yet still dispenses the hydrogen water to a user is necessary.

SUMMARY

In one aspect, a flexible pouch for holding a liquid is provided. The pouch includes a front portion and a back portion defining a compartment, a fitment and a frangible seal. The fitment has a body with a pair of wings extending outwardly from a center portion. The center portion has a spout. The front portion, the fitment and the back portion are joined together by a top seal. The frangible seal joining the front portion and back portion beneath the fitment. The frangible seal having a pair of ends, the one end of the pair of ends abutting a portion of the top seal under one of the pair of wings and the another end of the pair of ends abutting a portion of the top seal under another of the pair of wings to separate the spout from the contents in the compartment.

In another aspect, an apparatus for ultrasonic welding a flexible pouch is provided. The apparatus includes a base, an anvil, a horn, a guide, and a finger member. The base has a top surface mounted extending at an angle from horizontal. The anvil is mounted to the base. The horn is mounted to move to and away from the anvil. The guide is for positioning the pouch on the base. The finger member is movable to and away from the pouch such that the finger engages a lower portion of the pouch during welding.

In another aspect, a method of sealing a flexible pouch having a fitment is provided. The method includes mounting an anvil at an angle, placing a filled pouch on the anvil, pressing a lower portion of the pouch, pressing a horn onto the pouch on a side opposite the anvil, and forming a seal ultra-sonically.

In another aspect, a method of forming a frangible seal for a flexible pouch formed of flexible panels, overlaying two portions of the pouch is provided. The method includes placing the overlaid portions between an anvil and a horn and vibrating the overlaid portions to ultrasound frequency in a range between 15 kHz to 20 kHz from the horn for a predetermined period of time in the range of 0.06 seconds to 0.1 seconds to form the frangible seal These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
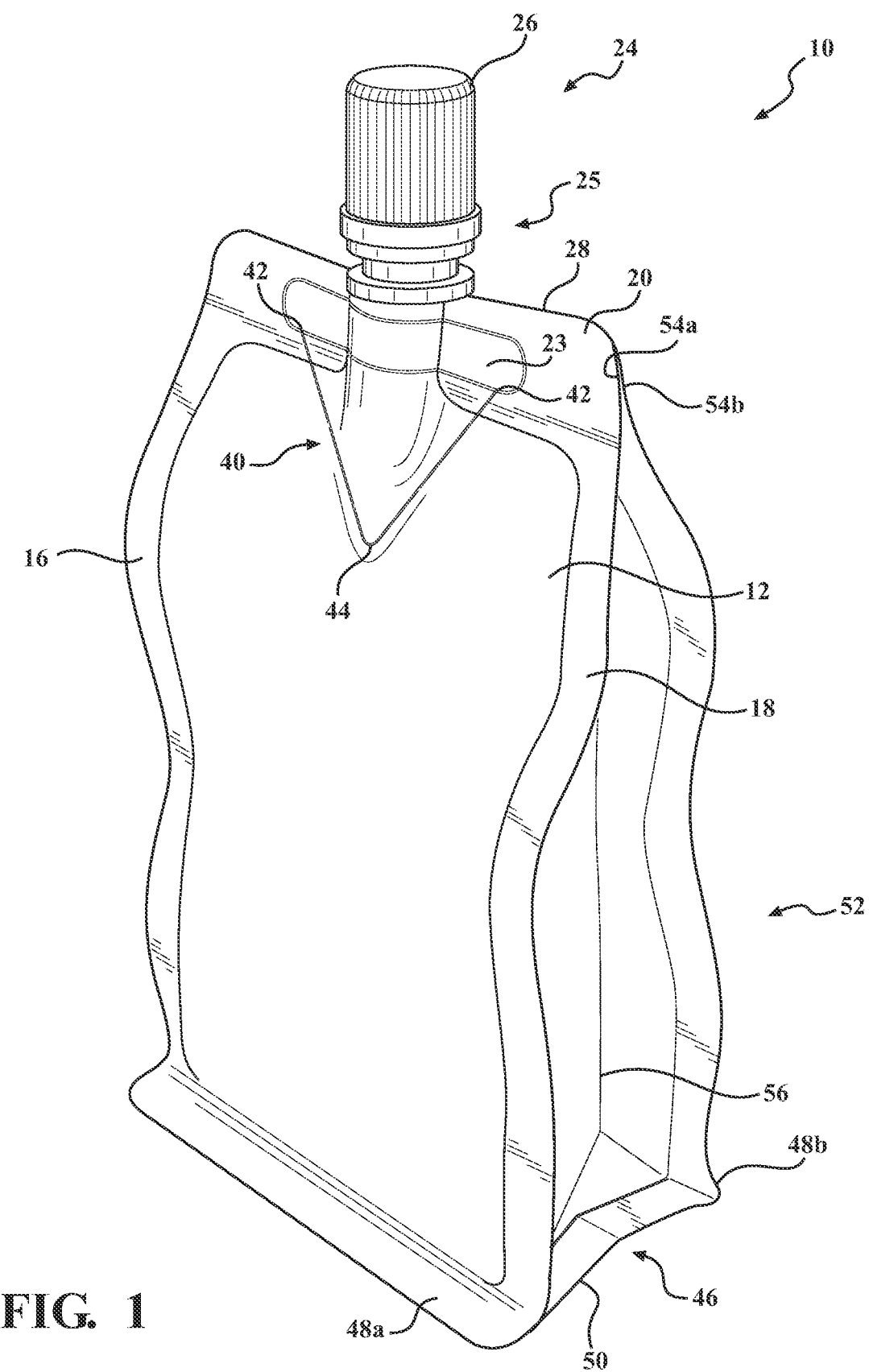
FIG. 1 schematically depicts a perspective view of a pouch according to one or more embodiments shown and described herein.
Figure 2:
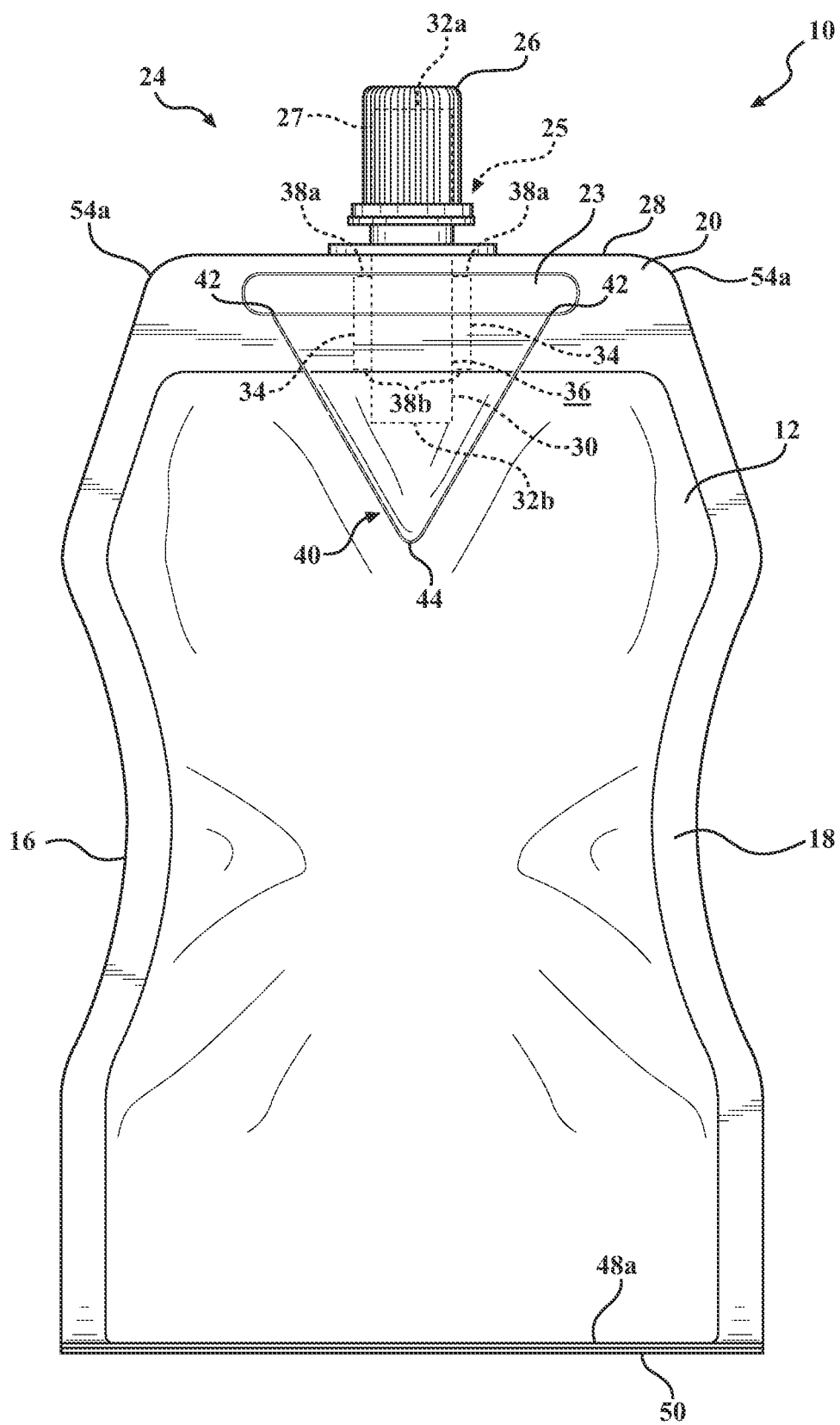
FIG. 2 schematically depicts a front view of the pouch of FIG. 1 according to one or more embodiments shown and described herein.
Figure 3:
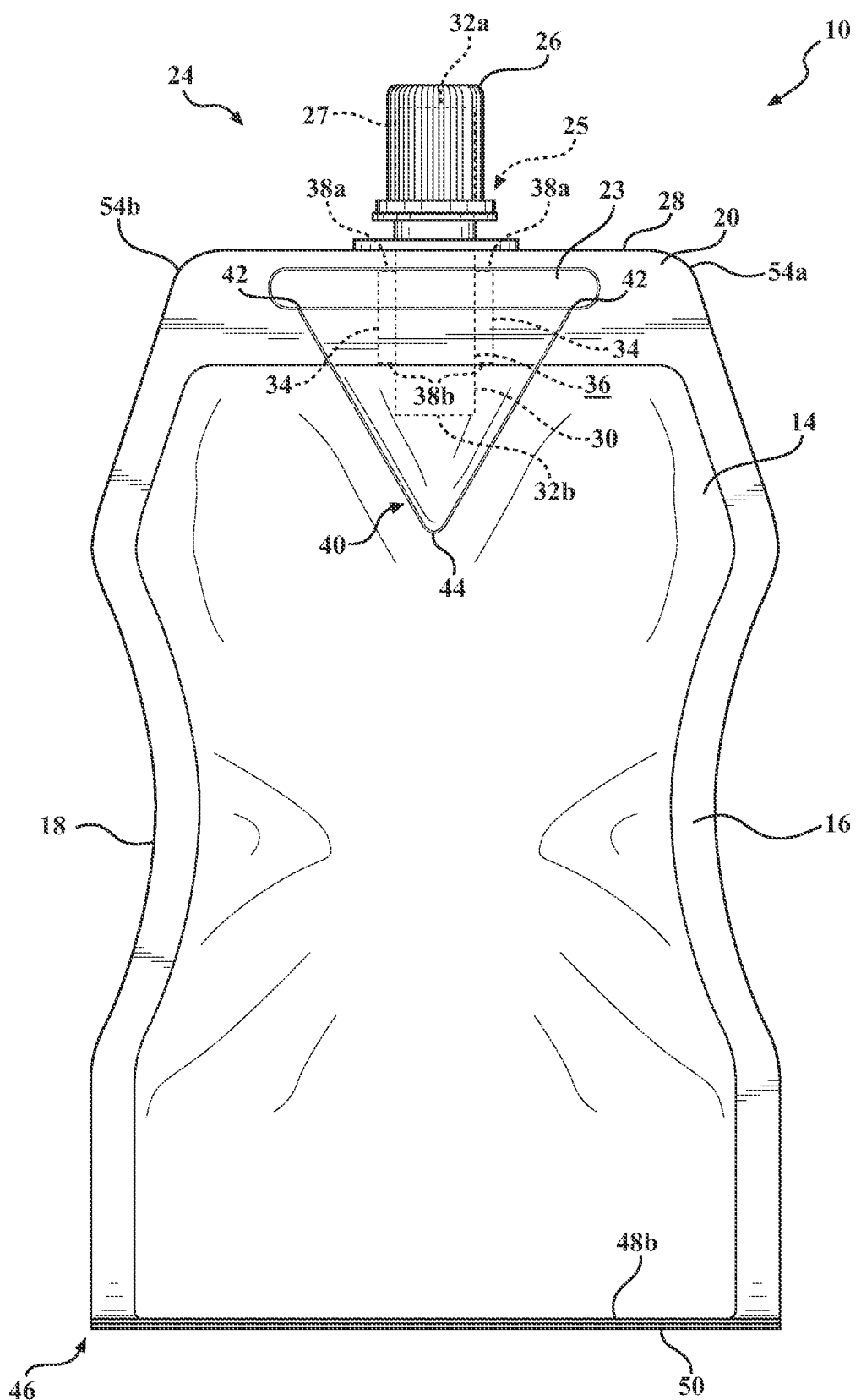
FIG. 3 schematically depicts a rear view of the pouch of FIG. 1 according to one or more embodiments shown and described herein.

A pouch configured to contain hydrogen-infused water is provided. The pouch includes a frangible seal formed from ultrasonic welding. The frangible seal is disposed between the contents of the pouch and the fitment. As such, the frangible seal is added after the contents of the pouch have been added. The frangible seal is positioned just above the added fluid of the container so as to minimize the amount of oxygen that can enter the pouch and contact the hydrogen water and also to prevent the water from coming into contact with the fitment and cap where the hydrogen can escape due to the fitment and cap having no barrier properties.

The frangible seal is formed through the use of a horn and anvil, where the pouch is placed on the anvil and the horn is pressed by an ultrasonic welding machine into the pouch. The size and the thickness of the frangible seal is adjustable. The frangible seal is formed by tilting the pouch at an angle such that an upper portion of the pouch is higher than a lower portion with respect to the anvil, applying a pressure to pouch and ultrasonic welding the frangible seal into the pouch. The frangible seal seals off an opening to the pouch so to prevent oxygen trapped in the opening during the manufacturing and/or filling process from contacting the hydrogen-infused water. The frangible seal is configured to burst under a pressure provided by a user, thereby allowing the user to access the hydrogen-infused water.

As used herein, "frangible seal" means a seal formed between layers of a pouch that is intended to rupture, at a given pressure, by merely applying a pressure via a human hand onto the seal. That is, a peel strength of the frangible seal is significantly less than that of the peripheral seal. As such, a bond of a frangible seal may not be solid between the different layers of the pouch to provide for a weakness to rupture. In some embodiments described herein, the peel strength of the frangible seal is between 0.945 and 1.155 pounds per square inch of force to rupture the seal. This is at least 9-12 times less pressure required than the pressure required to rupture the peripheral seal, as discussed herein.

As used herein, "peripheral seal" means a permanent bond between layers of the pouch that is not intended to rupture. A peripheral seal is a fixed barrier and has a peel strength significantly greater than that of the frangible seal. As such the bond of the peripheral seal is solid between the different layers to form a barrier, or permanent seal between the layers. That is, the peel strength of the peripheral seal is limited only by the burst properties of the materials used to form the peripheral seal. In some embodiments described herein, the peel strength of the peripheral seal is in a range between 9.18 and 11.22 pounds per square inch of force to rupture the peripheral seal. This is at least 9-12 times greater pressure required than the pressure required to rupture the frangible seal, as discussed herein.

Now referring to FIGS. 1-4, a flexible pouch 10 is schematically depicted. It should be appreciated that in some embodiments, the flexible pouch 10 may be a stand-up flexible pouch, as depicted in FIGS. 1-4. In other embodiments, the flexible pouch 10 may be any type of pouch that is adapted to contain a fluid. As such, the pouch illustrated in FIGS. 1-4 is non-limiting. The flexible pouch 10 includes a front panel 12 and a rear panel 14. The front panel 12 and the rear panel 14 are sealed to one another via various peripheral seals 16, 18, 20, to form a compartment 22. That is, the various peripheral seals 16, 18, 20, seal around the each peripheral edge of the flexible pouch 10 such that the various peripheral seals 16, 18, 20 permanently bonds the front panel 12 and the rear panel 14 to one another to form the compartment 22.

In some embodiments, the various peripheral seals 16, 18, 20 may be a single permanent peripheral seal. Further, in some embodiments, each of the various peripheral seals 16, 18, 20 may be formed by heat sealing. In other embodiments, the various peripheral seals 16, 18, 20 are formed by other methods appreciated by those skilled in the art. The compartment 22 may be adapted to contain, or hold, a gas, solid and/or liquid. For example, the compartment 22 may be adapted to contain, or hold a fluid, such as hydrogenated water.

A fitment 24 with a body 25 is provided along an upper edge 28 of the flexible pouch 10. In some embodiments, the fitment 24 may be centered along the upper edge 28. In other embodiments, the fitment 24 may be positioned anywhere along the upper edge 28 of the flexible pouch 10. The fitment 24 includes a center portion 30, or passage. The center portion 30 includes an opening 32a at one end and a spout 27 at the other end. The opening 32a is positioned within the flexible pouch 10 while the spout 27 is at the opposite end of the body 25 and out of the flexible pouch 10 at the spout 27. The spout includes an opening 32b. The center portion 30 extends within a gap of the peripheral seal 20 along the upper edge 28. As such, the gap may form a canoe shape that bows outwardly a portion of the front and rear panels 12, 14 created by the fitment 24 positioned between the front and rear panels 12, 14 through the gap.

The fitment 24, the front and rear panels 12, 14 are sealed together via a top seal 23. The top seal 23 seals the front and rear panels 12, 14 together and the fitment 24 therebetween thereby eliminating the gap. In some embodiments, the top seal 23 is formed via ultrasonic welding techniques. In other embodiments, the top seal 23 is formed via traditional heat bonding methods.

The opening 32a and the spout 27 are covered by a cap 26 when the cap 26 is secured onto the body 25 of the fitment 24. The cap 26 is removable to provide access to the spout 27 and the opening 32a, which in turn provides access to the contents of the compartment 22. In some embodiments, the cap 26 may be provided with a childproof or tamperproof feature to prevent ready access to or tampering of the product.

The opening 32b is positioned within the compartment 22 below the top seal 23 such that the opening 32b and a portion of the center portion 30 are in communication with the fluid held within the compartment 22. The center portion 30 of the fitment 24 extends through the top seal 23 and is adapted as an entry and/or exit for the gas, solid and/or liquid held in the compartment 22 of the flexible pouch 10.

The fitment 24 further includes a pair of wings 34 extending outwardly from an outer surface 36 of the center portion 30. A proximate end 38a of the pair of wings 34 extends from below the upper edge 28 and the wings extend downwardly towards the compartment 22. In some embodiments, a distal end 38b of pair of wings 34 terminates before the opening 32b and the compartment 22. In other embodiments, the distal end 38b of pair of wings 34 terminates at the opening 32b and the compartment 22.

In embodiments, a bottom gusset 46 may positioned between a bottom edge portion 48a of the front panel 12 and a bottom edge portion 48b of the rear panel 14 such that a stable base for the flexible pouch 10 is provided. That is, the bottom gusset 46 may be attached to the bottom edge portions 48a, 48b with a bottom portion 50 sealed to the bottom edge portions 48a, 48b such that the flexible pouch 10 can stand or remain upright as depicted in FIGS. 1-4.

Figure 4:
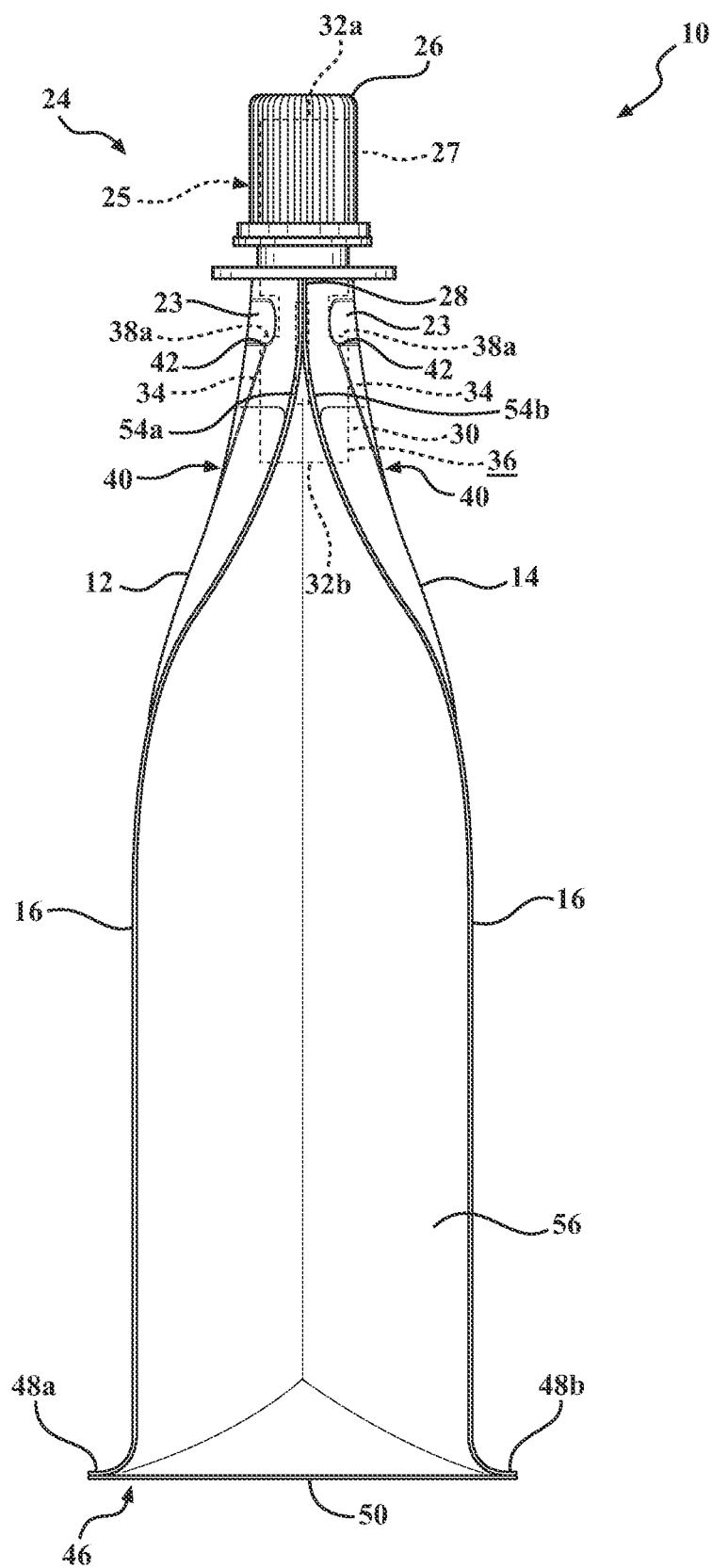
FIG. 4 schematically depicts a side view of the pouch of FIG. 1 according to one or more embodiments shown and described herein.

Further, a pair of side gussets 52 may be formed and positioned between the bottom gusset 48 and the top seal 23. Each of the pair of side gussets 52 may be positioned between an upper edge portion 54a and the bottom edge portion 48a of the front panel 12 and an upper edge portion 54b and the bottom edge portion 48b of the rear panel 14. That is, a side panel 56 of each of the pair of side gussets 52 may be attached to the upper edge portion 54a and the bottom edge portion 48a of the front panel 12 and the upper edge portion 54b and the bottom edge portion 48b of the rear panel 14, as best shown in FIG. 4.

A frangible seal 40 is positioned between the compartment 22 and the top seal 23. As such, in some embodiments, a portion of the frangible seal 40 abuts the top seal 23 and a portion of the frangible seal 40 extends into the compartment 22. In other embodiments, a portion of the frangible seal 40 extends into the top seal 23. The frangible seal 40 joins the front and rear panels 12, 14 and is adapted, in an unbroken state, to prevent hydrogen from the liquid held within the compartment 22 to escape through the center portion 30 and ultimately through the cap 26. When the user wants to drink the fluid held within the compartment 22, the frangible seal 40 is broken, or ruptured, by squeezing or applying a predetermined pressure onto the flexible pouch 10 to break or rupture the frangible seal 40.

In some embodiments, the frangible seal 40 is a V-shape. In this embodiment, each of a pair of terminating ends 42 of the V-shape are positioned to abut the top seal 23 and an inverse apex 44 of the V-shape is positioned within the compartment 22. In other embodiments, the frangible seal 40 may be square shaped, semicircular shaped, rectangular shape, and the like. In these embodiments, the terminating ends of the different shapes are positioned within or to abut the top seal 23 and portions of the shape are positioned within the compartment 22.

It should be appreciated that the terminating ends 42 of the frangible seal 40 are spaced apart and extend into or abut with the top seal 23. Further, the frangible seal 40 may be formed around and under each one of the pair of wings to encapsulate the opening 32b and to separate the compartment 22 from the spout 27. That is, the frangible seal 40 and the top seal 23 surround, or form a complete seal with one terminating end 42 under one of the pair of wings 34 and the other terminating end 42 positioned in a portion of the top seal 23 under the other one of the pair of wings 34 to separate the spout 27 from the contents in the compartment 22. The angle of the V-shape may be obtuse, acute, or a reflex angle. It should be appreciated that the shape of the frangible seal 40 may assist in localizing the stress of the flexible pouch 10 when squeezed, such that the different shapes of the frangible seal 40 require less pressure to burst, or rupture, the frangible seal 40.

It should be understood that in some embodiments, the fitment 24 is not required and that the frangible seal 40 may extend to cover the gap as discussed above. That is, the frangible seal 40 may extend between a peripheral seal, two peripheral seals, and the like, such that the frangible seal 40 may be a breakable seal between the compartment and the gap of the peripheral seal(s).

The front and rear panels 12, 14 are formed from a film laminate including a layer of aluminum or silicon oxide. The film laminate, in some embodiments, may be PET/AL/NY/LLDPE; PETALOx/NY/LLDPE; or PETSiOx/NY/LLDPE. Further, varying thickness of the film may be used. For example, a PET film layer may have a thickness of 12 microns, a center aluminum layer having a thickness of 9 microns and an inner layer of S-LLDPE that has a thickness of 150 microns may be used. Such an arrangement provides an airtight seal to preserve the longevity of the fluid within the compartment 22. Further, the outer layer of PET may be satisfactory for printing labeling information and warning information, the middle aluminum layer may provide an airtight seal for the flexible pouch 10, and the inner layer of S-LLDPE may melt to form an adhesive for bonding the front and rear panels 12, 14 of the flexible pouch together around the peripheral seals 16, 18, 20, to seal the fitment 24 or closures in place, and for forming of the frangible seal 40 using ultrasonic welding techniques, as discussed in greater detail herein. Further, it should be understood that film laminates provide or inherently include barrier properties to prevent hydrogen from escaping through the pouch.

The film laminate may be formed into a pouch having three sides on a conventional pouch making machine. The fitment may be heat sealed or ultra-sonically welded along the upper edge 28 of the flexible pouch 10 to form the top seal 23. The flexible pouch 10 is then filled with the fluid into the compartment 22 and the cap 26 is secured onto the fitment to seal the center portion 30 and the spout 27.

Figure 5:
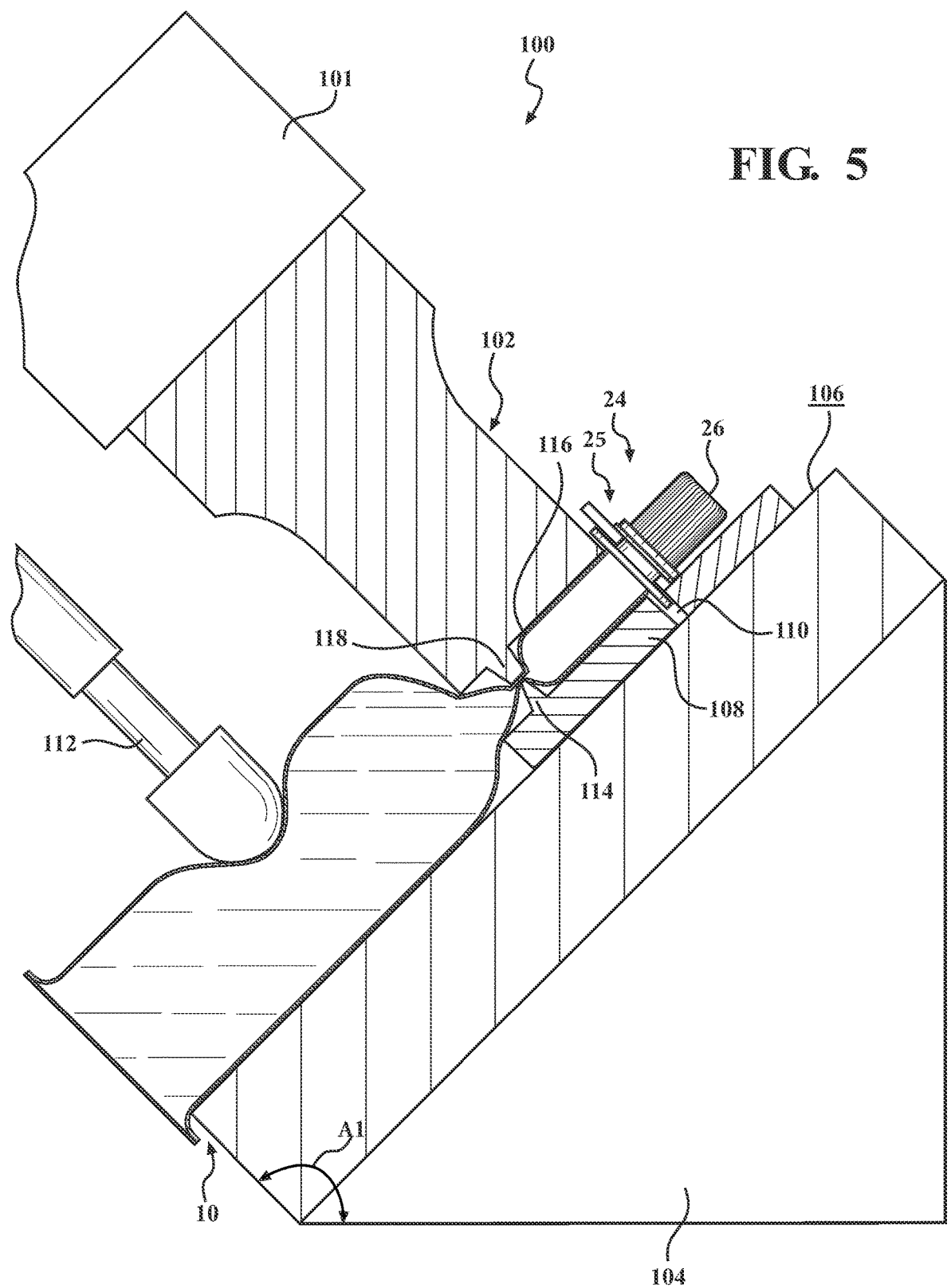
FIG. 5 schematically depicts a partial cross-sectional view of a machine and the pouch of FIG. 1 forming a frangible seal according to one or more embodiments shown and described herein.

Now referring to FIG. 5, the frangible seal 40 is formed via ultrasonic welding. It should be understood that ultrasonic welding is effective through liquids, such as water, unlike traditional heat seal methods. An additional benefit of ultrasonic welding is that it can weld any potential pouch material, such as PET/AL/NY/LLDPE; PETALOx/NY/LLDPE; PETSiOx/NY/LLDPE, and the like. These laminates beneficially have barrier properties preventing hydrogen from escaping through the pouch.

The ultrasonic welder system 100 includes an ultrasonic welding machine 101, which further includes a horn 102 that moves relative to the ultrasonic welding machine 101, a base 104, an anvil 108, a guide 110, and a finger member 112. The ultrasonic welding machine 101 may be any ultrasonic welding system machine. Further, the time of welding, the amplitude control, the frequency, hold time, and the like are all customizable based on the type of pouch, pouch material, contents, frangible seal shape, and the like.

The horn 102 includes a distal end 116 that is moved between an engaged positon and a disengaged positon with respect to the flexible pouch 10. The distal end 116 of the horn 102 includes a shape 118 to form the shape of the frangible seal 40, as discussed in greater detail herein. In the engaged position, the shape 118 of the distal end 116 of the horn 102 is in contact with the desired portion of the flexible pouch 10 to add the frangible seal 40, as best shown in FIG. 5. In this position, the horn 102 ultrasonically welds in the frangible seal 40, as discussed in greater detail herein. In the disengaged positon, the shape 118 of the distal end 116 of the horn 102 is not in contact with the flexible pouch 10.

The base 104 includes an upper surface 106 and may be positioned to be a separate component from the ultrasonic welding machine 101. The upper surface 106 may be angled with respect to horizontal, indicated by the arrow A1 in FIG. 5. The anvil 108 is mounted to the upper surface 106. In some embodiments, the angle of the upper surface 106 and the anvil 108 is 45 degrees. In other embodiments, the angle of the upper surface 106 and the anvil 108 is less than or greater than 45 degrees. The angle of the upper surface 106 relative to the base 104 is to position the flexible pouch 10 at an angle to permit oxygen and other containments that may have entered the compartment 22 during the manufacturing and/or filling process to escape, as discussed in greater detail herein.

In some embodiments, the anvil 108 includes a complementary shape 114. The complementary shape 114 is complementary to the shape 118 positioned on the distal end 116 of the horn 102. As such, the complementary shape 114 may extend outwardly from the anvil 108. The size and shape of both the shape 118 of the horn 102 and the complementary shape 114, and the operating parameters of the ultrasonic welding machine 101 may vary the size and thickness of the frangible seal 40, as discussed in greater detail herein. Further, it should be understood that each of the shapes of the frangible seal 40 may have a corresponding shaped anvil and horn. That is, a plurality of shapes are envisioned for the frangible seal and thus each of these shapes may have a corresponding shaped anvil and horn to form the shape.

Further the upper surface 106 and/or the anvil 108 includes the guide 110 for positioning or holding the flexible pouch 10 onto the upper surface 106 of the base 104. The guide 110 may be adapted to positively locate the flexible pouch 10 against the upper surface 106 and ultimately properly position the pouch against the complementary shape of the anvil 108.

For example, a portion of the fitment 24 may be received within the guide 110 to hold the flexible pouch 10 in place. As such, it should be understood that the guide 110 assists in repeatability and in quality of the frangible seal 40 formation. In some embodiments, a finger member 112 is positioned to move between a contact and non-contact position (to and away) with respect to the flexible pouch 10 such that in the contact position, as best shown in FIG. 5, the finger member 112 is in contact with a lower portion of the flexible pouch 10 (e.g., towards the bottom seal 50) to apply a pressure to the lower portion of the flexible pouch 10 and the contents within the compartment 22. In the non-contact position, the finger member 112 is not in contact with the flexible pouch 10. In other embodiments, the finger member 112 may not be automated and may be a user's hand or finger that applies a pressure on the lower portion of the flexible pouch 10.

Still referring to FIG. 5, the frangible seal 40 is formed through the use of a vibration applied to the flexible pouch 10 through the horn 102 and the anvil 108 when the flexible pouch 10 is positioned at an angle on the anvil 108. The ultrasonic welding machine 101 operates on a plurality of frequencies. In some embodiments, the frequency is between 20 kHz and 40 kHz. In other embodiments, the frequency is less than 20 kHz and/or greater than 40 kHz. Further, a plurality of parameters may be used to form the frangible seal 40. For example, a weld time, a hold time, a delay time and an amplitude setting for different frequencies.

Figure 6:
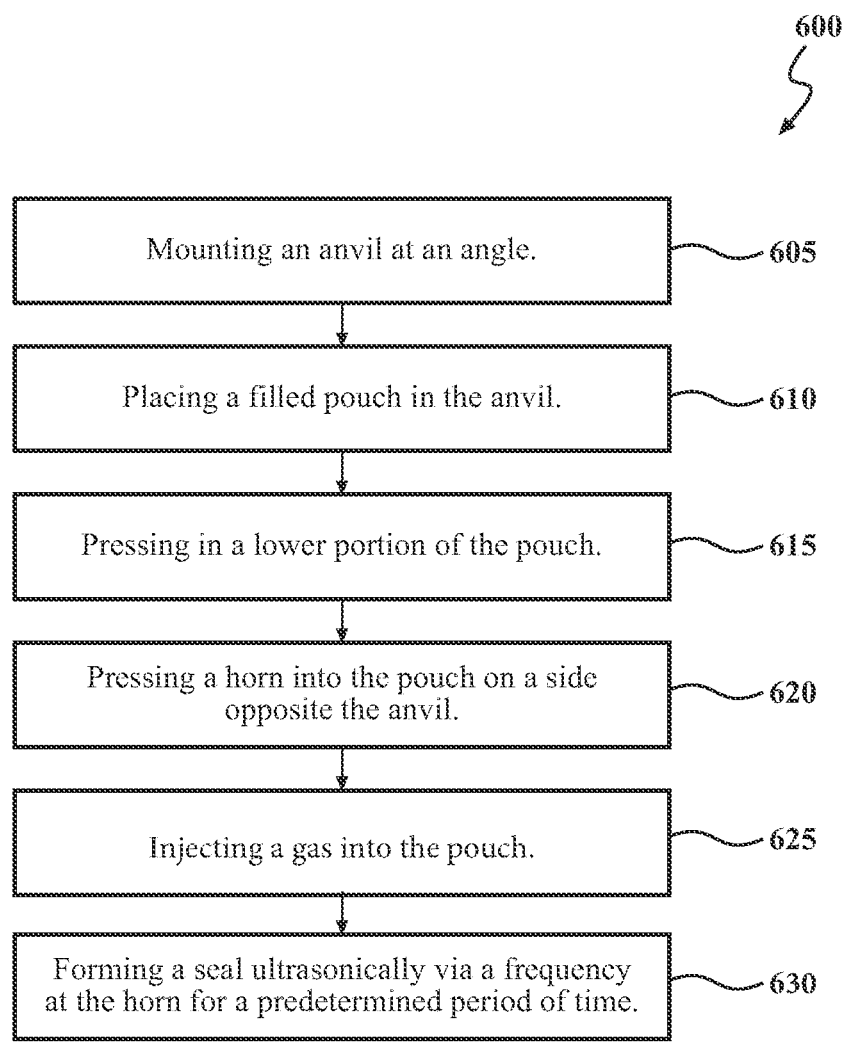
FIG. 6 depicts a flowchart of an illustrative method carried out by the machine of FIG. 5 to form the pouch of FIG. 1 according to one or more embodiments shown or described herein.

Now referring to FIG. 6, a flowchart of an illustrative method 600 for forming the frangible seal on the flexible pouch is illustrated. Although the steps associated with the blocks of FIG. 6 will be described as being separate tasks, in other embodiments, the blocks may be combined or omitted. Further, in other embodiments, the steps may be performed in a different order. The filled flexible pouch is not limiting and the method 600 described herein may be used in any container that uses flexible panels, overlaying two portions. It is particularly advantageous for a container that already contains a fluid because the method 600 for forming the frangible seal may be formed through the fluid or liquid within the container.

At block 605, an anvil is mounted at an angle. In some embodiments, the angle may 45 degrees. In other embodiments, the angle may be between 20 degrees and 45 degrees. In yet other embodiments, the angle may be greater than 45 degrees. At block 610, a filled flexible pouch is placed onto the anvil. The fitment and/or portions of the fitment may be located with the guide to positively locate the flexible pouch with respect to the anvil. Further, the fitment is positioned above the bottom edge in a vertical direction. In some embodiments, the rear panel of the pouch is positioned to be in contact with the anvil while the front panel is positioned to be in contact with the horn. In other embodiments, the front panel of the pouch is positioned to be in contact with the anvil while the rear panel is positioned to be in contact with the horn At block 615, a lower portion of the pouch is pressed on. This may be via the finger member or via a user's hand. That is, the finger member is moved from the non-contact position into the contact position. It should be appreciated that the pressure applied to the lower portion of the pouch may be anywhere below the area where the frangible seal is going to be placed in the vertical direction. It should be understood that the tilting of the pouch and applying a pressure to the pouch moves or drives liquid to the top of the pouch, at the fitment, such that any residual gas within the pouch, such as oxygen, is driven into the fitment, out of the compartment, and remains trapped there once the frangible seal is formed.

At block 620, the horn is pressed onto the pouch on a side opposite of the anvil. That is, the horn is moved from the disengaged position into the engaged position. It should be appreciated that the time that the horn is in contact with the pouch may vary, the time between pulses, and the like, may all be varied. In some embodiments, at block 625, a gas, such as nitrogen, is injected into the pouch. This step reduces the amount of oxygen that is sealed within the pouch, which prevents the infused hydrogen from combining with oxygen. At block 630, a seal is formed ultrasonically using a frequency at the horn for a predetermined period of time. It should be appreciated that a frequency, a weld time, a hold time, and an amplitude may all influence the forming of the frangible seal.

It should be appreciated that ultrasonic welding creates a preferred seal compared to heat sealing as heat sealing over a liquid requires additional heat to counteract cooling caused by the liquid. As such, using ultrasonic welding eliminates this issue. Further, it should be appreciated that this disclosed methods prevents the hydrogen infused in the water from mixing with oxygen in the pouch, thereby increasing the shelf life of the hydrogen-infused water by maintaining a high concentration of hydrogen.

In operation, when the pouch is ready for use by the consumer, the frangible seal is ruptured by the consumer by applying a pressure directly to the frangible seal to promote rupturing of the seal or the contents are squeezed against the seal to rupture the frangible seal. The fitment is then opened and the contents are ready to be consumed by the consumer. The inner frangible seal prevents the hydrogenated water from reaching the fitment and cap where the hydrogen in the water can escape through the fitment and cap that both have very little barrier properties. The inner frangible seal also prevents oxygen from reaching the contents and thereby diffusing the contents.

Example Section

TABLE 1

| Weld Time | Hold Time | Delay Time | Amplitude Setting | Result |
|---|---|---|---|---|
| 0.10-0.06 s | 0.80-0.30 s | 0.20-0.50 s | 35%-44% | Formation of satisfactory frangible seal |
| Less than 0.06 s | 0.80-0.30 s | 0.20-0.50 s | 35%-44% | frangible seal too weak to hold hydrogen |
| More than 0.10 | 0.80-0.30 s | 0.20-0.50 s | 35%-44% | frangible seal too strong to rupture |
| 0.10-0.06 s | Less than 0.30 s | 0.20-0.50 s | 35%-44% | frangible seal too weak to hold hydrogen |
| 0.10-0.06 s | More than 0.80 s | 0.20-0.50 s | 35%-44% | frangible seal too strong to rupture |
| 0.10-0.06 s | 0.80-0.30 s | 0.20-0.50 s | Less than 35% | frangible seal too weak to hold hydrogen |
| 0.10-0.06 s | 0.80-0.30 s | 0.20-0.50 s | More than 44% | frangible seal too strong to rupture |

Table 1 above illustrates the testing parameters that were used with a 20 kHz frequency ultrasonic welding machine and anvil as described above with respect to FIG. 5. The weld time is the amount of time that the ultrasonic welding machine is welding. The hold time is the duration for which pressure is maintained to ensure proper bonding of the parts. The hold time deactivates ultrasonic. The delay time deactivates the solenoid valve drive circuits and waits for the after burst time to expire. The amplitude percentage is a measure of how far a component's face moves during ultrasonic vibration.

As illustrated in Table 1, in one example, at a 20 kHz frequency, the formation of the frangible seal 40 with a desired pressure range for rupturing the frangible seal 40 while also providing a strength to prevent the hydrogen within the compartment 22 from escaping is a weld time between 0.10-0.06 seconds, a hold time between time 0.80-0.30 seconds, a delay time between 0.20-0.50 seconds and an amplitude setting between 35%-44%. At these parameters, an example frangible seal may be formed that requires an approximately range between 0.945 and 1.155 pounds per square inch of force to rupture the frangible seal. This range also allows the frangible seal to retain the hydrogen within the fluid of the flexible pouch. It should be appreciated that this is non-limiting and that different values may be used at different frequencies to achieve the desired results with respect to the frangible seal 40.

As illustrated in table 1, when the weld time is less than 0.06 seconds, the frangible seal is not strong enough to retain the hydrogen within the compartment of the flexible pouch and/or the frangible seal ruptures too easily, such as during transportation. On the other hand, when the weld time is greater than 0.10 seconds, the frangible seal is too strong to rupture and may have similar characteristics to the peripheral seals. Likewise, when the hold time is less than 0.30 seconds, the frangible seal is not strong enough to retain the hydrogen within the compartment of the flexible pouch and/or the frangible seal ruptures too easily, such as during transportation. On the other hand, when the hold time is greater than 0.80 seconds, the frangible seal is too strong to rupture and may have similar characteristics to the peripheral seals. Similarly, when the amplitude percentage is less than 35%, the frangible seal is not strong enough to retain the hydrogen within the compartment of the flexible pouch and/or the frangible seal ruptures too easily, such as during transportation. On the other hand, when the amplitude percentage is greater than 44%, the frangible seal is too strong to rupture and may have similar characteristics to the peripheral seals.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A flexible pouch for holding a liquid, the flexible pouch comprising:
   a front panel and a back panel sealed to one another via a plurality of peripheral seals to define a compartment receiving a liquid;
   a gap disposed in an upper peripheral seal of the plurality of peripheral seals along an upper edge between the front panel and the back panel above the compartment;
   a fitment positioned within the gap, the fitment including a body with a pair of wings extending outwardly from a center portion, the center portion having a spout;
   the front panel, the fitment, and the back panel joined together by a top seal, the top seal structured and arranged to seal the gap;
   an ultrasonic frangible seal formed through the liquid joining the front panel and the back panel beneath the fitment, the frangible seal having a pair of ends, one end of the pair of ends abutting a portion of the top seal and another end of the pair of ends abutting another portion of the top seal to separate the fitment from liquid in the compartment;
   wherein a top edge of the top seal is disposed below the upper edge;
   wherein a bottom edge of the top seal is non-overlapping with an inner edge of the upper peripheral seal; and
   wherein the top seal extends laterally completely along the body of the fitment and beyond the pair of wings.

2. The flexible pouch of claim 1, wherein:
   the frangible seal joining the front panel and the back panel beneath an opening of the center portion of the fitment, one end of the pair of ends of the frangible seal abutting the portion of the top seal under one of the pair of wings and the another end of the pair of ends of the frangible seal abutting the portion of the top seal under another of the pair of wings to separate the spout from the contents in the compartment.

3. The flexible pouch of claim 2, wherein the frangible seal, in an unbroken state, prevents the liquid from leaving the compartment into the fitment.

4. The flexible pouch of claim 2, wherein the frangible seal, in a ruptured state, allows the liquid to leave the compartment enter into the spout.

5. The flexible pouch of claim 1, wherein the frangible seal has a V-shape between the pair of ends.

6. The flexible pouch of claim 5, wherein an inverse apex of the V-shape of the frangible seal is positioned within the compartment.

7. The flexible pouch of claim 5, wherein the frangible seal has arcuate portion between the pair of ends.

8. The flexible pouch of claim 1, further comprising a bottom gusset sealed to bottom edge portions of the front panel and the rear panel.

9. The flexible pouch of claim 1, wherein the pair of ends of the frangible seal extend into the top seal.

10. The flexible pouch of claim 1, wherein the top seal is ultrasonic welded.

11. The flexible pouch of claim 1, wherein a proximate end of the pair of wings extends from below the upper edge and the pair of wings extend downwards towards the opening of the fitment.

12. The flexible pouch of claim 11, wherein a distal end of the pair of wings terminates before the opening of the center portion of the fitment and the compartment, and the opening extends into the compartment; and
   wherein the bottom edge of the top seal is disposed above the distal end of the pair of wings.

13. The flexible pouch of claim 1, wherein the inner edge of the upper peripheral seal is disposed closer to the compartment than the bottom edge of the top seal.

14. A method of sealing a flexible pouch as claimed in claim 1, the method comprising the steps of:
   mounting an anvil at an angle;
   placing a filled pouch on the anvil;
   pressing a lower portion of the pouch;

pressing a horn onto the pouch on a side opposite the anvil; and forming a seal ultra-sonically.

15. The method of claim 14, wherein the angle of the anvil to horizontal is within a range of twenty to 45 degrees.

16. The method of claim 15, wherein the filled pouch is placed on the anvil at the angle and the lower portion of the pouch is pressed to force a gas into the fitment.

17. A method of forming a frangible seal for a flexible pouch as claimed in claim 1, comprising:

overlaying two portions of the pouch;

placing the overlaid portions between an anvil and a horn; and vibrating the overlaid portions to ultrasound frequency in a range between 15 kHz to 20 kHz from the horn for a predetermined period of time in the range of 0.06 seconds to 0.1 seconds to form the frangible seal.

18. A flexible pouch for holding a liquid, the flexible pouch comprising:

a front panel and a back panel sealed to one another via a plurality of peripheral seals to define a compartment receiving a liquid;

a fitment disposed in an upper peripheral seal of the plurality of peripheral seals along an upper edge between the front panel and the back panel above the compartment;

a top seal joining the front panel, the fitment, and the back panel together;

an ultrasonic frangible seal structured and arranged to join the front panel and the back panel beneath the fitment, the frangible seal having a pair of ends, one end of the pair of ends abutting a portion of the top seal and another end of the pair of ends abutting another portion of the top seal to separate the fitment from liquid in the compartment; and wherein the fitment includes a body with a pair of wings extending outwardly from a center portion, the center portion having a spout and an opening;

wherein a proximate end of the pair of wings extends from below the upper edge and the pair of wings extend downwards towards the opening of the fitment;

wherein a top edge of the top seal is disposed below the upper edge;

wherein a bottom edge of the top seal is non-overlapping with an inner edge of the upper peripheral seal; and wherein the top seal extends laterally completely along the body of the fitment and beyond the pair of wings.

19. The flexible pouch of claim 18, wherein the frangible seal joins the front panel and the back panel beneath the opening of the center portion of the fitment, one end of the pair of ends of the frangible seal abutting one of the lateral ends of the top seal under the proximate end of one of the pair of wings and the another end of the pair of ends of the frangible seal abutting another one of the lateral ends of the top seal under the proximate end of another of the pair of wings to separate the spout from the contents in the compartment.

20. The flexible pouch of claim 18, wherein the pair of ends of the frangible seal extend into the top seal.

21. The flexible pouch of claim 18, wherein a distal end of the pair of wings terminates before the opening of the center portion and the compartment, and wherein the opening extends into the compartment.

22. The flexible pouch of claim 18, wherein the inner edge of the upper peripheral seal is disposed closer to the compartment than the bottom edge of the top seal.

* * * * *